United States Patent Office 3,561,258
Patented Feb. 9, 1971

3,561,258
APPARATUS FOR TESTING TUBES OR RODS BY ULTRASONICS
Roland Ashford, Pelsall, near Walsall, and Dennis Terry, Hayley Green, England, assignors to S.T.D. Services Limited, Edgbaston, Birmingham, England, a British company
Filed Mar. 1, 1968, Ser. No. 709,699
Claims priority, application Great Britain, Mar. 1, 1967, 9,694/67; Mar. 8, 1967, 10,899/67
Int. Cl. G01n 29/04
U.S. Cl. 73—71.5        8 Claims

ABSTRACT OF THE DISCLOSURE

An ultrasonic tester for tubes has an array of angularly adjustable carriers arranged around a passage through which the test piece is passed. Each carrier has two transducers with their axes co-planar and inclined in opposite directions at equal angles to the carrier axes. One set of transducers is pulsed sequentially and the other set are connected in a synchronised sequence to a detector.

---

U.S. Pat. No. 3,415,111 describes and claims an apparatus for testing tubes or rods by ultrasonics, of the kind comprising a body having therethrough a passage through which a tube or rod to be tested can be passed longitudinally, at least one transducer element carried by the body and arranged to transmit and/or receive ultrasonic energy into or from a tube or rod under test, and means for electrically connecting the transducer element to a signal generating and/or detecting device, in which the transducer element is carried on a carrier member mounted in a bore in the body and angularly movable relative thereto about an axis having at least a component parallel to the passage in the body.

The present invention is concerned with a modification to the arrangement described in the said U.S. Pat. No. 3,415,111.

The modification resides in a mechanism for simultaneously adjusting a series of carrier members arranged around said passage in the body, said mechanism comprising a ring having thereon a plurality of abutments engaged with abutments on the individual carrier members, the ring being mounted for angular movement relative to the body about said passage, so that turning of said ring produces simultaneous turning of said carrier members.

The invention also comprehends the use of the invention forming the subject of U.S. Pat. No. 3,415,111 in conjunction with the method of testing described in British Pat. No. 866,457. To this end each carrier member carries a pair of transducers namely a transmitter and a receiver arranged at spaced positions along the carrier with their axes co-planar and inclined to the axis thereof at equal angles in opposite directions.

Figure 1:
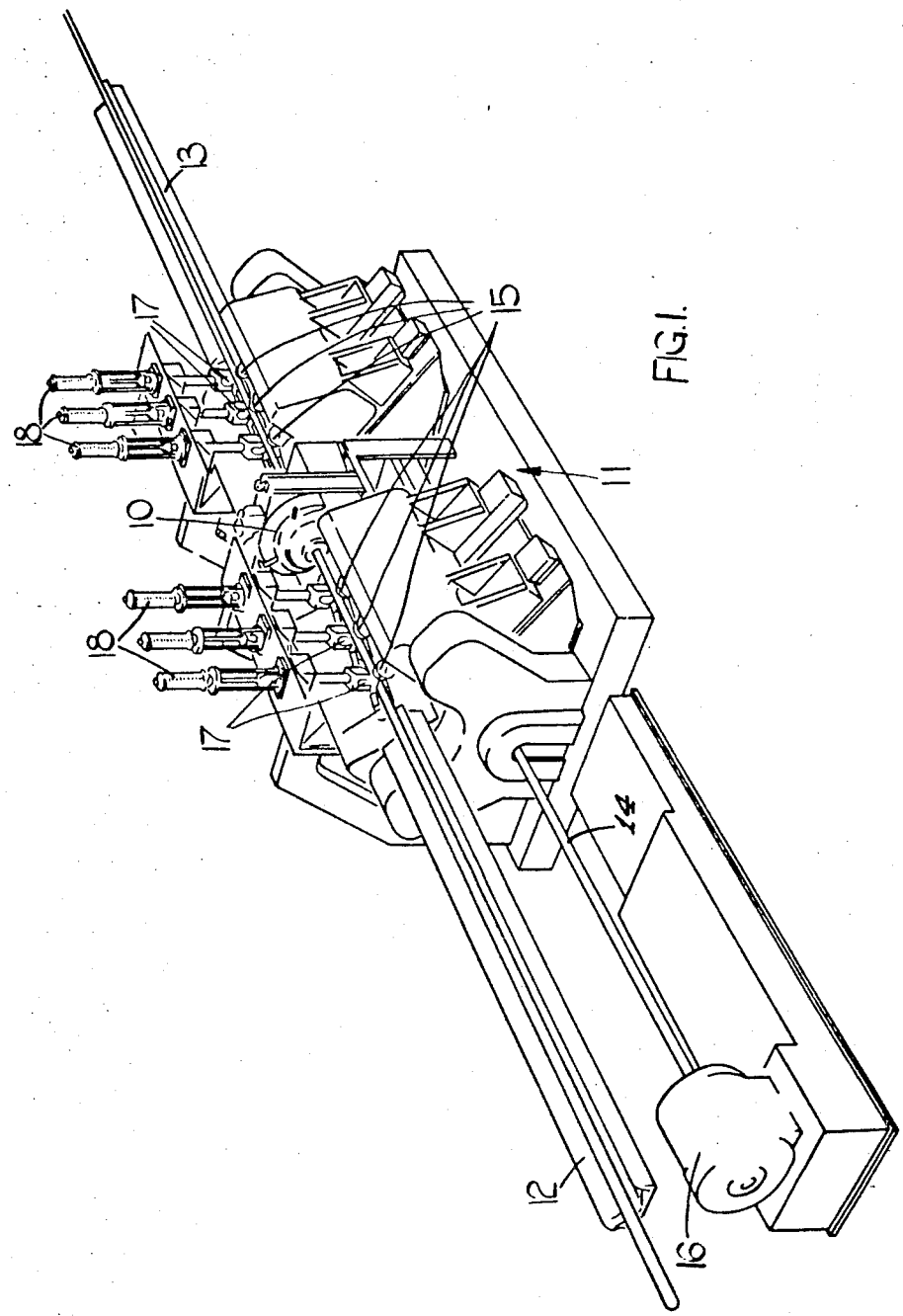
Figure 2:
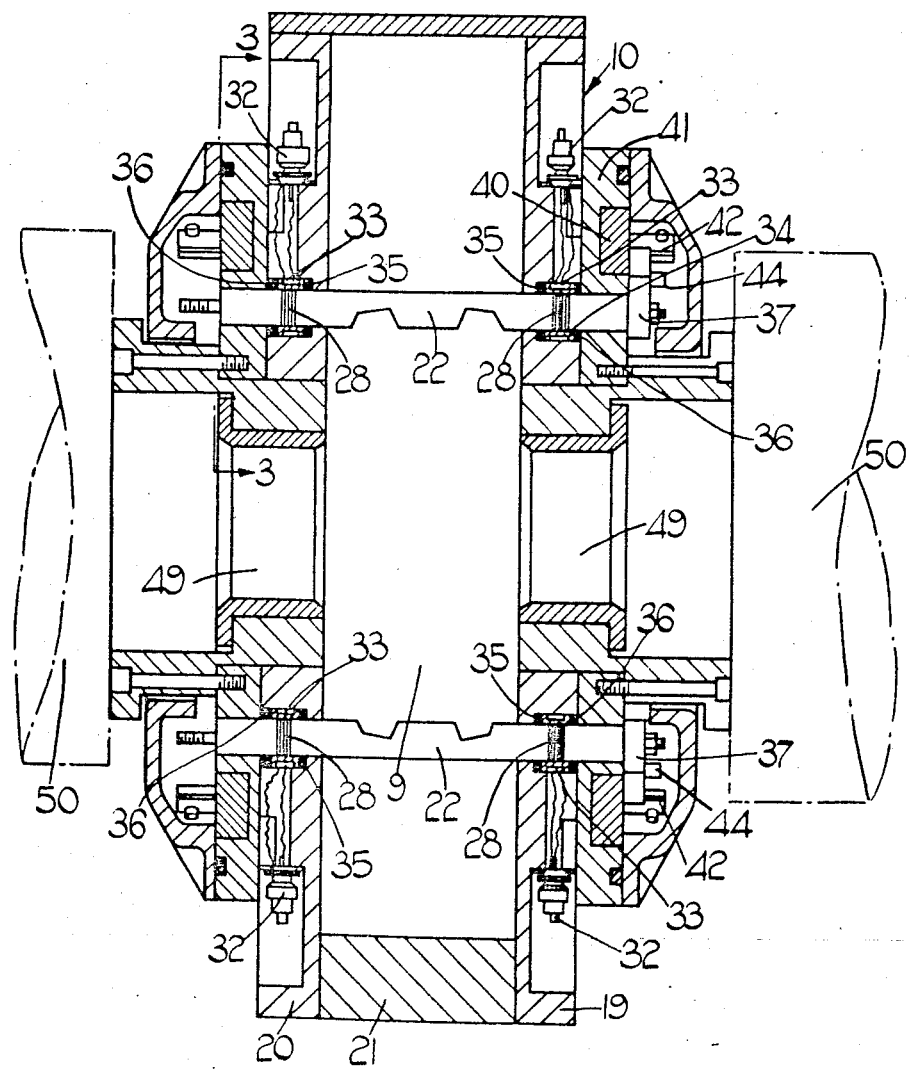
Figure 3:
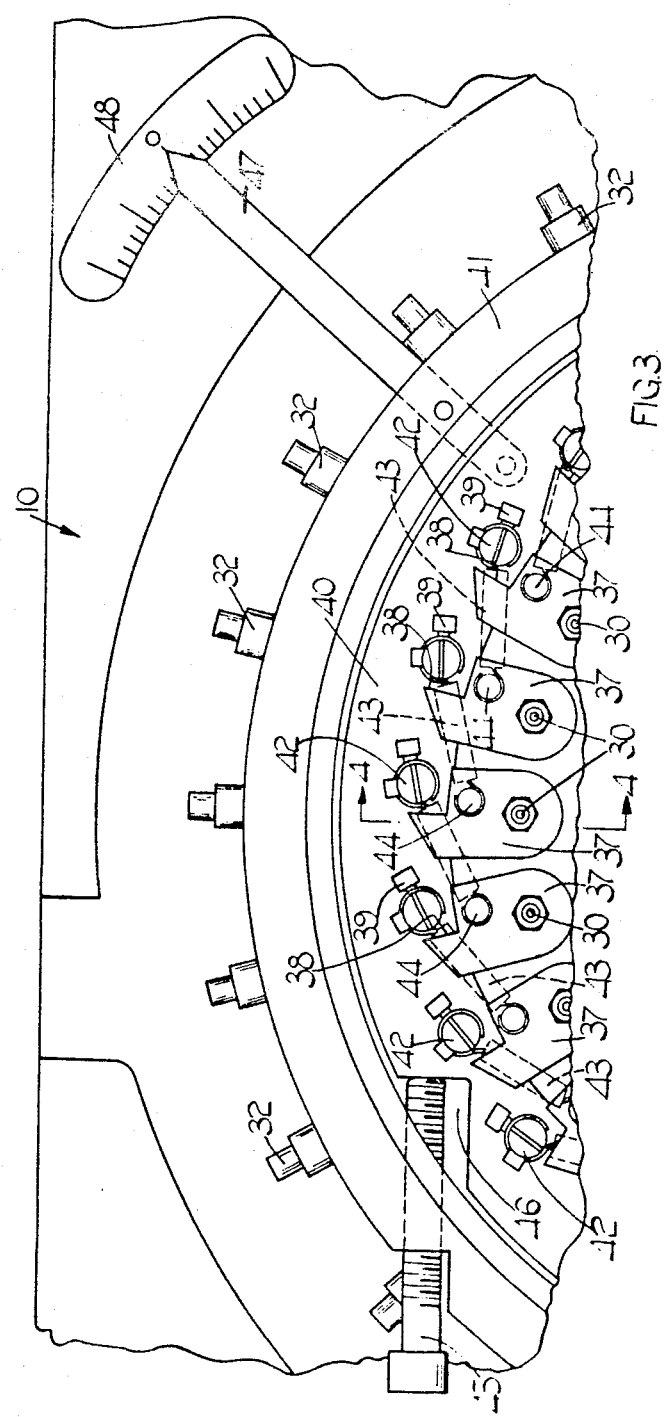
Figure 4:
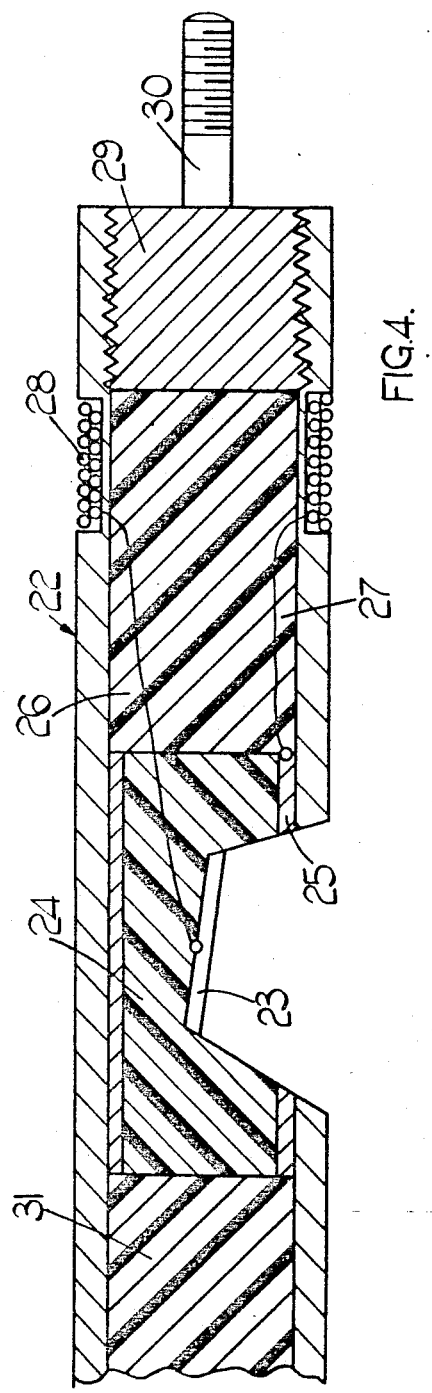
Figure 5:
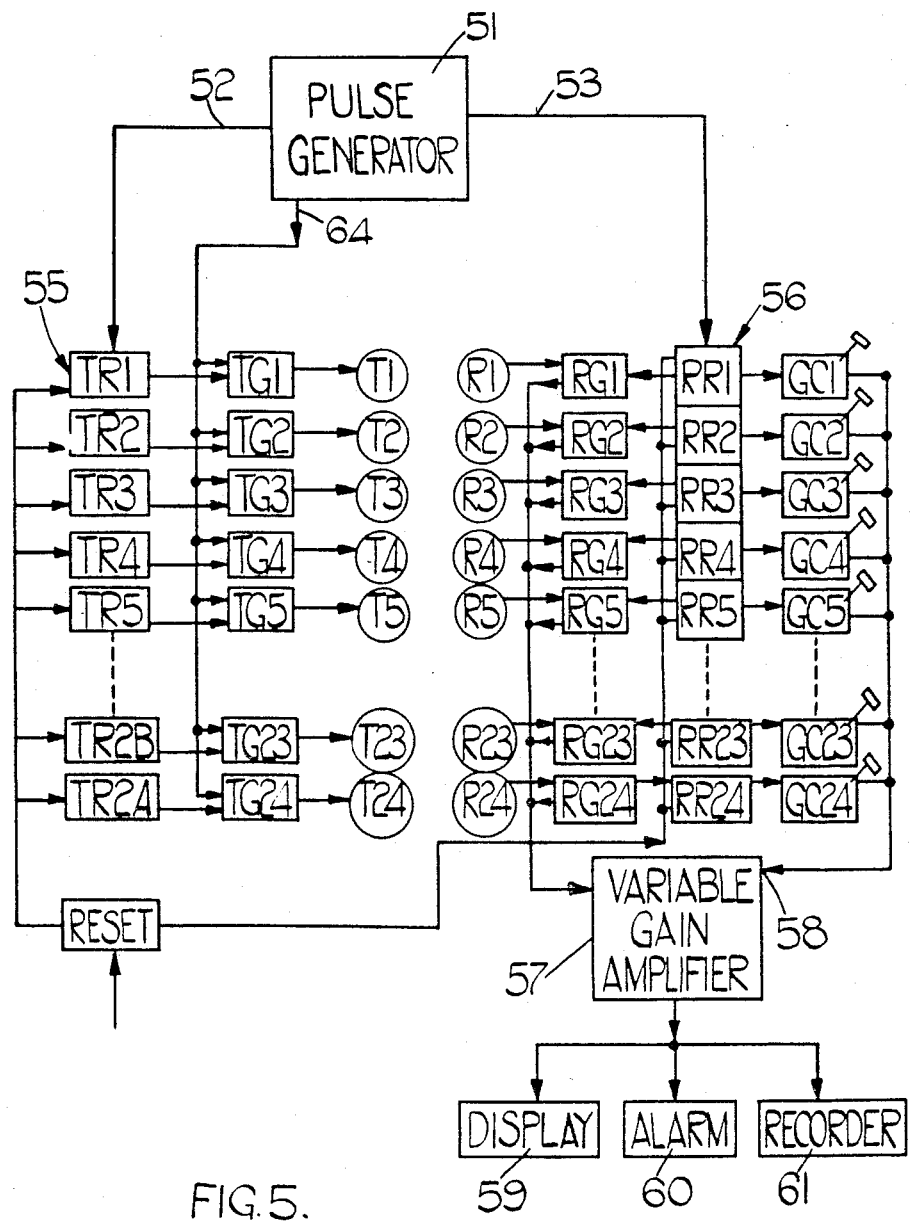

In the accompanying drawings:
FIG. 1 is a perspective view of an example of ultrasonic testing apparatus in accordance with the invention;
FIG. 2 is an enlarged section through a head forming a part of the apparatus,
FIG. 3 is a further enlarged fragmentary section on line 3—3 in FIG. 2,
FIG. 4 is a still further enlarged fragmentary section on the line 4—4 in FIG. 3 of a single part of the head, and
FIG. 5 is an electrical circuit diagram of the apparatus.

Referring to the drawings the apparatus includes a head 10 supported on a bed 11 incorporating a pair of aligned elongated troughs 12, 13 on opposite sides of the head 10. The bed also supports roller means for rotating and axially advancing a tube 14 carried thereby. Such roller means comprise a plurality of rollers 15 which are rotatable on axes skew to the tube axis and which are driven by a drive motor 16. The tube is held in contact with the rollers 15 by similarly skewed idling rollers 17 thrust downwardly on to the tube by pneumatic cylinder units 18. The skewness of the rollers 15, 17 can be adjusted to suit tubes of different diameters.

Turning now to FIG. 2 the head 10 consists basically of a pair of spaced parallel annual plates 19, 20 held apart by spacing means 21 to define a chamber 9 within the head. Extending through the chamber between the plates 19, 20 are a plurality of probe carrier members 22 each in the form of a length of stainless steel tube. Each carrier member 22 is cut away at a pair of positions spaced from its ends to reveal an ultrasonic transducer element 23. This transducer 23 which is in the form of lead zirconate crystal wafer, silvered on both sides, is supported in a plane inclined to the axis of the carrier member 22 such that normals at the centres of the two transducers 23 on each carrier member 22 are co-planar and are equally inclined in opposite directions from a plane normal to the axis of the carrier member 22. In addition the centre point of each transducer 23 lies on the axis of the carrier member 22.

Each transducer 23 is actually supported on a backing 24 of tungsten powder-filled epoxy resin within a copper tube 25. The crystal 23 and the tube 25 are connected by leads 26, 27 to opposite ends of a coupling coil 28 wound in a groove in the extension of the carrier member 22 between the cut-away in which the transducer 23 is mounted and the adjacent end of the carrier member 22.

Each end of each carrier member 22 receives a plug 29 on which there is a threaded stem 30 co-axial with the carrier member 22. The interiors of the carrier members are filled with epoxy resin 31.

In the present example there are twenty four of the carriers 22 equi-angularly spaced around the axis of the head 10. Mounted in recesses in the outer faces of the plates 19, 20 are twenty four pairs of connectors 32 each of which is connected to a coil 33 associated with the appropriate end on an associated one of the carrier members 22. Each such coil 33 is carried by a spool 34 surrounding the coil 28 at the associated end of the carrier member 22 concerned. The spool 34 also serves to compress against the associated plate 19 or 20 an O-ring seal 35 which seals off the bore in the plate through which the carrier member 22 concerned passes. Another O-ring seal 36 is compressed against the opposite end of each spool 34.

For angular adjustment of the carrier members 22 each member has attached to one of its ends, an arm 37 secured in position by means of the screw-threaded stem 30 on the carrier member 22. Each arm 37 has an abutment face 38 extending in an axial-radial plane with respect to the axis of the carrier. The arms 37 co-act with adjustable abutments 39 on a ring member 40 mounted in an annular recess in a disc 41 secured to the plate 20. The abutments 39 are, in fact, screws engaged in cross bores in pegs 42 projecting from the ring member 40. The ring member 40 is angularly movable about the axis of the head 10. Coil springs 43 act between pegs 44 on the arms 37 and the pegs 42 to urge all the arms 37 in clockwise directions as viewed in FIG. 3, so as to keep the abutment faces 38 in contact with the abutments 39. The springs 43 (which are omitted for clarity from FIG. 2) also serve to urge the ring member 40 in an anti-clockwise direction as viewed in FIG. 3.

An adjusting screw 45, engaged in a tapped bore in the disc 41, abuts one face of a notch 46 cut in the outer periphery of the ring member 40. Thus simultaneous, equal angular displacements of all the carrier members 22 can be effected by turning of screw 45 which causes angular displacement of the ring member 40. Adjustment of the individual carrier members 22 can be effected utilizing the adjustable abutments 39.

A pointer 47 pivoted to the disc 41 is connected by a pin and slot connection to the ring member 40 so as to be swung on angular movement of ring member 40 relative to the disc 41. The pointer co-acts with a scale 48 to give a direct reading of the angle at which the aforementioned plane of the normals of the transducers on any carrier member 22 is inclined to a plane including the axes of the head and the carrier member concerned.

In use the chamber 9 of the head is kept full of water to act as a coupling medium for the ultrasonic waves passing between the transducers and the tube. A pair of guide bushes 49 guide the tube through the chamber 9 and these are associated with a pair of sealing devices 50 which minimise leakage of water from the chamber 9. These sealing devices 50 can be of various forms and their detailed construction is not relevant to the present invention.

Each coil 28 and the associated surrounding coil 33 forms a transformer coupling in the connection of the associated transducer 23 to a pulse source for energising the transducer or to a detector for detecting ultrasonic waves received by the transducer. In the arrangement described all the transducers 23 at the left-hand side of FIG. 2 may be regarded as acting as transmitters whilst those at the right-hand side act as receivers.

FIG. 5 shows an arrangement by means of which the transmitting transducers 23 are caused to transmit ultrasonic waves sequentially and the receiving transducers 23 are simultaneously scanned. The arrangement is controlled by a master pulse generator 51 which has three output connections 52, 53 and 64. At the connections 52 and 53 symmetrical square wave forms, 180° out of phase, are produced by the generator. At connection 64 a train of pulses commencing synchronously with the square waves at connection 52, but of short duration, are produced. The square wave form from connection 52 is used to drive a conventional ring counter 55 made up of individual bistable stages TR1, TR2 . . . TR24. The ring counter 55 is, as is conventional, such that one of the stages TR1 to TR24 delivers an output at any time, each input signal received by the counter acting to cause the stage following the stage currently producing an output, to commence producing an output whereupon the previously conducting stage ceases to produce an output. Ring counters of this type are well known and detailed description thereof herein would thus be redundant.

The outputs of the individual stages TR1 to TR24 of the counter 55 are connected respectively to inputs of a bank of electronic AND gates TG1 to TG24. These gates also have input connections from the connection 54 of the generator 51 and are of any known form such that an output signal is only produced by a gate while signals are being received at both of its input terminals.

The output connections of the gates TG1 to TG24 are connected respectively to transmitter circuits T1 to T24 including the twenty-four transmitting transducers 23 and their associated transformer couplings 28, 33. Thus the transmitting transducers 23 are briefly energised at the commencement of each cycle of the square wave.

There is also a twenty-four stage receiver ring counter 56 driven by the square wave form derived from the connection 53 of the generator 51. The stages RR1 to RR24 of this ring counter are respectively connected to receiver gates RG1 to RG24 so as to control the passing of signals from receivers R1 to R24 respectively, each including a receiving transducer 23 and the associated transformer coupling 28, 33 to an amplifier 57. A manual reset circuit is connected to reset the ring counters 55, 56 on starting up of the circuit to ensure that the first stage TR1 of counter 55 and the first stage RR1 of counter 56 are made to produce an output first. It will be appreciated that, thereafter, the ring counter 56 will always lag exactly one half cycle of the square wave form behind the counter 55.

The amplifier 57 is of any convenient variable gain type with a gain control terminal 58 the magnitude of the voltage applied to which determines the gain of the amplifier. There are twenty-four gain control circuits GC1 to GC24 which are connected sequentially to the gain control terminal 58 under the control of the receiver ring counter 56. These gain control circuits are individually adjustable so that variations in the sensitvity of the individual transducer gate circuit arrangements can be allowed for. The circuits GC1 to GC24 are adjusted when the apparatus is set up to ensure that the output from the amplifier 20 is the same for a given flaw echo irrespective of which transducer is in position to recive the echo from the flaw.

The amplifier 57 is connected to feed any convenient display 59, an alarm 60 and/or a recorder 61 which makes a permanent record of flaw signals received by the amplifier 57.

For operation the carrier members 22 are set up at angles, in relation to the diameter and thickness of the tube under test, determined in accordance with the instructions given in British Pat. No. 866,457. It is thereby ensured that ultrasonic waves reflected by the surface of the tube do not fall on the receiving transducers. Owing to the 180° phase lag of the square wave signal applied to the receiver ring counter 56 behind the square wave signal applied to the transmitter ring counter, the receiving transducers cannot pass signals to the amplifier until the emission of ultrasonic waves by the transmitting transducers has ceased. Thus the only significant signals received by the receiving transducers and passed by the receiver gates to the amplifier are waves actually rebounding from flaws within the wall of the tube.

The combination of the rapid scanning of the tube resulting from the sequential operation of the transmitter transducers and the sequential connection of the receiving transducers to the amplifier with the rotation of the tube as it is fed through the control passage in the head 10 ensures very complete coverage of the tube in the search for flaws therein. It is considered that each transmitter/receiver probe unit can effectively scan a portion of the periphery of the tube subtending an angle of 5° at the axis of the tube. Thus seventy two probe units would be required for complete scanning of the periphery of the tube. In view of various size limitations, however, it has been found more convenient for the tube to be rotated to allow fewer probe units to be employed. With the twenty four units employed in the example described a tube of up to two inches outer diameter could be fed through the head 10 at a speed of the order of 180 feet per minute if flaws of ½" length and less can be tolerated, whilst it is rotated at a rate in the region of 240 revolutions per minute. The tube rotates through one complete revolution for each three complete cycles of the ring counters.

The probe adjusting mechanism described above can also be employed when utilizing transducers in the form of crystal wafers each of which has its normal axis perpendicular to the carrier member axis. As described in U.S. application No. 712,085 (D. M. Wilson) such an arrangement may be employed with the transducers acting as transceivers or with any given transducer acting at a particular instant to pick up flaw signals reflected after an ultrasonic pulse has been transmitted by another transducer circumferentially spaced from that given transducer. A similar scanning arrangement is employed to connect the transducer sequentially to the generator and the detector.

Having thus described our invention what we claim as new and desire to secure by Letters Patent is:

1. Apparatus for the testing of tubes for flaws by ultrasonics comprising a head having a passage therethrough, a plurality of cylindrical carrier members mounted in bores in said head angularly movable relative thereto about their own axes which are parallel to the passage, each carrier element being cut away at a position spaced from its ends, a plurality of crystal wafer transducers mounted in the cut away portions of said carriers respectively, means connecting said transducers to a flaw detection instrument including a generator and a detector, a plurality of abutments on said carrier members respectively, each abutment being spaced from the axis of the associated carrier member, a ring co-axial with the passage and mounted on the head for angular movement about the passage and a plurality of abutments on the ring engaged respectively with the abutments on the carrier members, whereby the carrier members can be angularly adjusted in unison by movement of the ring.

2. Apparatus as claimed in claim 1 in which the abutments on the ring are adjustable screws engaged with pegs on the ring and acting, on adjustment thereof, to adjust the individual angular positions of the carrier members.

3. Apparatus as claimed in claim 1 in which the ring is mounted in an annular groove in the head and the carrier members are each provided with an arm which extends across the ring, said arms being formed to provide the abutments on the carrier members.

4. Apparatus as claimed in claim 3 including a plurality of springs acting between the respective arms and the ring, holding the aforesaid abutment in interengaged relation and biasing the ring to a limiting position.

5. Apparatus as claimed in claim 4 including a screw-threaded stop engaged in a notch in the ring and adjustable to vary the limiting position of the ring.

6. Apparatus for use in ultrasonic testing as claimed in claim 1 in which each carrier member carries a pair of transducers spaced axially of the carrier member, said transducers having their normal axes coplanar and equally inclined to the carrier axis in opposite directions.

7. Apparatus as claimed in claim 6 in which the means connecting the transducers to the instrument comprises a series of transmitter gates connecting a set of the transducers to the generator, a first sequence control actuating said gates singly in cyclic sequential order, a series of receiver gates connecting the remaining transducers to the detector, and a second sequence control, synchronised with the first sequence control to lag slightly, actuating said receiver gates singly in the same cyclic sequential order.

8. Apparatus for the testing of tubes for flaws by ultrasonics comprising a head having a passage therethrough to receive a tube for testing, a plurality of carrier members mounted in said head and angularly movable relative thereto about pivot axes parallel to the passage, a plurality of transducers on said carriers respectively, means connecting said transducers to a flaw detection instrument including a generator and a detector, a plurality of abutments on said carrier members respectively, each abutment being spaced from the pivot axis of the associated carrier member, a ring co-axial with the passage and mounted on the head for angular movement about the passage, and a plurality of adjustable abutments on the ring engaged respectively with the abutments on the carrier members, individual adjustment of said adjustable abutments effecting adjustment of the individual angular positions of said carrier members, and angular movement of the ring effecting adjustment of the angular positions of the carrier members in unison.

References Cited

UNITED STATES PATENTS 3,183,709    5/1965    Rankin et al. _____ 73—67.5
3,415,111    12/1968    Chattaway et al. _____ 73—67.8

FOREIGN PATENTS 866,457    4/1961    Great Britain _____ 73—67.7

JAMES J. GILL, Primary Examiner